United States Patent [19]

Oblas et al.

[11] Patent Number: 4,604,276
[45] Date of Patent: Aug. 5, 1986

[54] INTERCALATION OF SMALL GRAPHITE FLAKES WITH A METAL HALIDE

[75] Inventors: Daniel W. Oblas, Bedford; Sophia R. Su, Weston, both of Mass.

[73] Assignee: GTE Laboratories Incorporated, Waltham, Mass.

[21] Appl. No.: 533,512

[22] Filed: Sep. 19, 1983

[51] Int. Cl.$^4$ .......................... C01B 31/02; H01B 1/06
[52] U.S. Cl. ..................................... 423/449; 423/454; 423/458; 252/506; 252/507; 252/508; 556/140; 523/137
[58] Field of Search ............... 252/502, 506, 507, 508; 260/429 R, 438.1, 429.3, 439 R, 440, 446; 523/137; 423/453, 454, 458, 448, 449, 458; 556/1, 28, 36, 43, 52, 58, 64, 112, 140, 170

[56] References Cited

U.S. PATENT DOCUMENTS 3,956,194  5/1976  Armand ............................... 252/506
4,461,719  7/1984  Vogel et al. ......................... 252/506

OTHER PUBLICATIONS

"The Effect of Flake Size on Composition of Graphite Ferric Chloride", Hooley, J. A. & Somassy, R. N., *Carbon*, vol. 8, pp. 191–196.

"Intercalation Compounds of Graphite", Dresselhaus et al, *Advances in Physics*, vol. 30, No. 2, pp. 139–326 (1981).

"Graphite Intercalation Compounds", Fischer et al, *Physics Today*, pp. 36–45 (1978).

"Investigation into Methods for Producing Micron Particles from Graphite Flakes & Fibers", Tech. Proposal, GTE Labs. (8-82).

*Primary Examiner*—Josephine L. Barr
*Attorney, Agent, or Firm*—Hamilton, Brook, Smith & Reynolds

[57] ABSTRACT

A method and apparatus for intercalating small graphite flakes with a metal halide. Graphite and a metal halide are placed in two chambers 12, 14 of a rotary vapor transport reactor assembly 10 and heated. The reactor is charged with a halogen gas and rotated by motor 24 during synthesis to produce a homogenous and uniform intercalated product.

11 Claims, 5 Drawing Figures

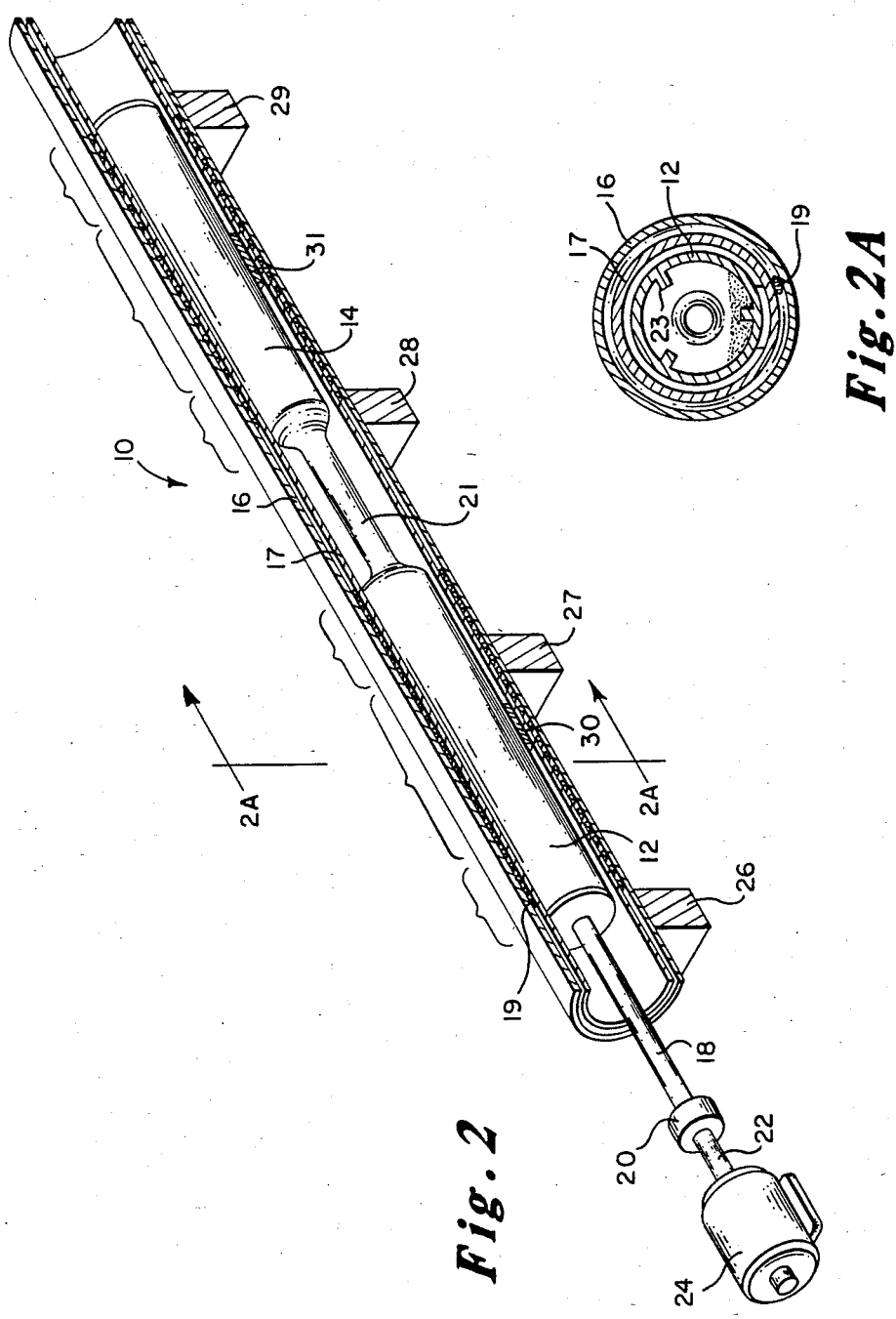

INTERCALATION OF SMALL GRAPHITE FLAKES WITH A METAL HALIDE

DESCRIPTION

1. Field of the Invention

This invention relates to graphite and particularly to methods of intercalating small graphite flakes.

2. Background of the Invention

Graphite is a crystalline form of carbon which is a moderate conductor of electricity and is relatively soft. The carbon atoms in graphite form a layer structure in which the carbon atoms in the plane are covalently bonded to each other.

In graphite, each carbon atom is bonded to three other carbon atoms in each layer. After forming a strong covalent sigma ($\sigma$) bond with each neighbor, each carbon atom still has one free electron remaining and these are paired up in a system of weak pi ($\pi$) bonds. It is the fourth, or $\pi$ electron, that is responsible for the lamellar structure and electronic properties of graphite. The $\pi$ electrons form a delocalized distribution which constitute a valance band for the fundamental state of graphite and a conduction band for excited states.

The graphite layers, or sheets are weakly bonded to each other by van der Waals forces. This weak bonding between layers may account for the lubrication properties and the highly anisotropic (layer directed) conductive nature of graphite.

The intercalation or the incorporation of acceptor or donor compounds into the layered structure of graphite has been known for many years. Intercalated graphite contains the acceptor or donor compounds (intercalant) interspaced between the layers, or planes, of graphite. Thus, during synthesis the intercalant diffuses in between the planes and electron exchanges take place between the intercalant and the electronic structure of graphite.

Synthetic graphite such as HOPG (highly oriented pyrolytic graphite) can be intercalated with metal halides, other electron-acceptors or electron-donors. HOPG is synthetically formed by cracking a hydrocarbon at high-temperature and subsequent heat treatment combined with the application of pressures.

Carbon fibers are another class of synthetic graphite and have great mechanical strength. Successful intercalation of graphite fibers would provide a method for variation of properties in a commercially important class of materials.

Intercalated graphite may form different stage products. A first stage intercalation has alternate layers of graphite and the intercalant (FIG. 1A); a second stage compound (FIG. 1B) has two layers of graphite for each layer of intercalant; and a third stage compound has three layers of graphite per layer of intercalant (FIG. 1C), etc.

Intercalation of graphite with certain intercalants greatly enhances the ability of the graphite to conduct electricity in the planes of the layered structure. Some graphite intercalant compounds, for example, conduct electricity in the direction of the planes almost as well as metals, such as copper.

In addition to being an excellent electrical conductor, intercalated graphite is lightweight and relatively inexpensive when compared to many metallic conductors. It is this promise of an inexpensive and extremely lightweight conductor that has provided the motivation for experiments designed to intercalate graphite particles. It should also be noted that intercalated graphite might be specially tailored for optical and electrical properties if its stability could be improved. Tailoring these compounds could be done by changing the type and amount of intercalant.

Metal halides, particularly $FeCl_3$, can be intercalated into graphite flakes of large particle size (greater than 30 microns) so as to produce a low stage intercalant compound of $FeCl_3$ and graphite. It has been found that as the particle size is reduced to the low micron range, intercalation to attain a low or even moderate stage compound becomes more difficult and even impossible in many cases.

Conventional synthesis for small particle size graphite is carried out using vapor transport techniques. In conventional two temperature zone reactors, synthesis of large quantities of graphite intercalant compounds is difficult because synthesis of large batches results in inhomogeneous and non-uniform compound formation. Further, conventional synthesis has required prolonged reaction times and is uneconomical for production of these compounds outside the laboratory environment.

An example of a conventional synthesis can be found in an article entitled "The Effect of Flake Size on the Composition of Graphite Ferric Chloride", by J. G. Hooley and R. N. Soniassy, Carbon, Vol. 8, pp 191–196 (1970). In this article graphite of various flake sizes was reacted with ferric chloride ($FeCl_3$). The conclusions stated in the article cannot be fully substantiated due to the lack of x-ray characterization of the products but do seem to indicate the difficulties of intercalating small size graphite flakes. It is believed that $FeCl_3$ condensation on the graphite during cooling of the flakes described in the article distorted the recorded results.

There are also several problems preventing the effective utilization of intercalated graphite material. Firstly, graphite has proved easy to intercalate only in polycrystalline HOPG and large particle size graphite powder. Typically, pieces of HOPG intercalated have been about 0.25" diameter and 0.010" thickness. Material of this size is expensive to obtain. Further, as the material is made smaller, reaction time increases such that intercalation synthesis becomes uneconomical and in the case of very small particles, impossible.

An object of this invention, therefore, is to provide a method and apparatus for intercalating small flakes of graphite with an intercalant that promotes electrical conductivity and/or other desirable properties.

SUMMARY OF THE INVENTION

The invention consists of a method of intercalating small graphite flakes in a rotary two zone vapor-transport reactor. The graphite flakes are placed in a first zone of the reactor and a metal halide is placed in a second zone of the reactor. The reactor is evacuated, the reactants outgassed, and the reactor is charged with an intercalation-promoting halogen gas.

Heat is supplied to the second zone of the reactor in order to vaporize the metal halide and produce a pressure of the metal halide sufficient to promote intercalation. The first zone of the reactor is heated to a temperature slightly above that in the second temperature zone in order to prevent condensation of the metal halide on the graphite. The reactor is rotated and reaction conditions are maintained until the graphite flakes have been intercalated with the metal halide to the desired stage.

BRIEF DESCRIPTION OF THE DRAWINGS

FIG. 2 is a partial cross section of a rotary reactor utilized in intercalation synthesis of small graphite flakes according to the principles of this invention.

FIG. 2A is a transverse cross section of the rotary reactor taken along lines 2A of FIG. 2.

DETAILED DESCRIPTION OF THE INVENTION

Figure 1C:
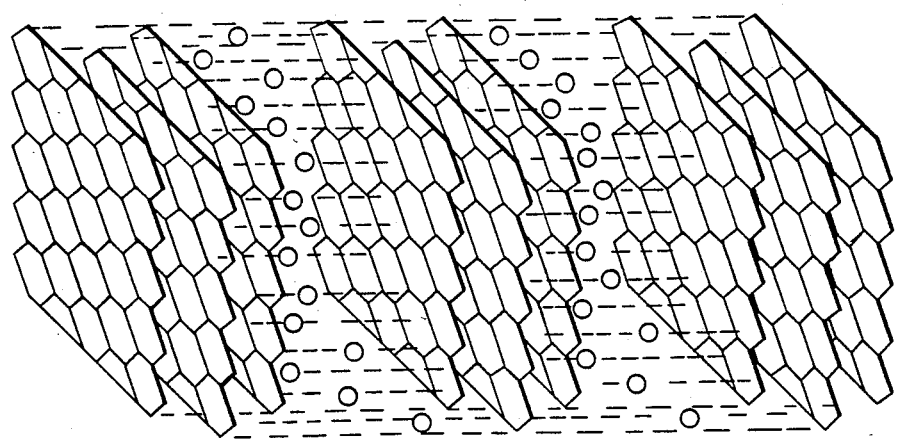
FIG. 1C is a schematic perspective view of a third stage intercalation of graphite.
Figure 1B:
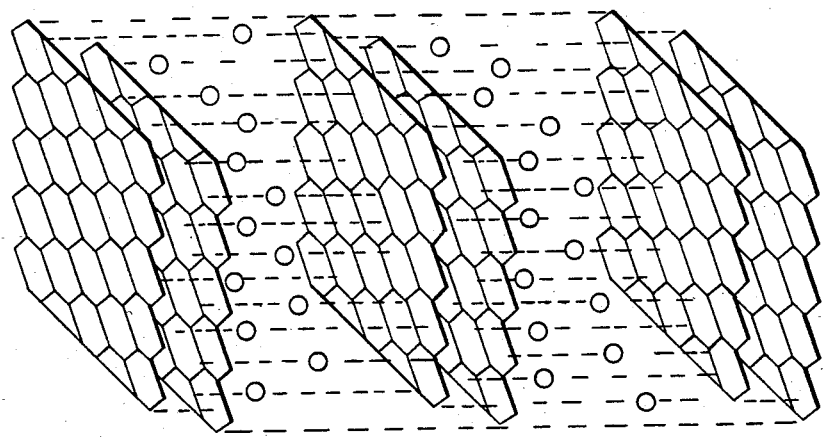
FIG. 1B is a schematic perspective view of a second stage intercalation of graphite.
Figure 1A:
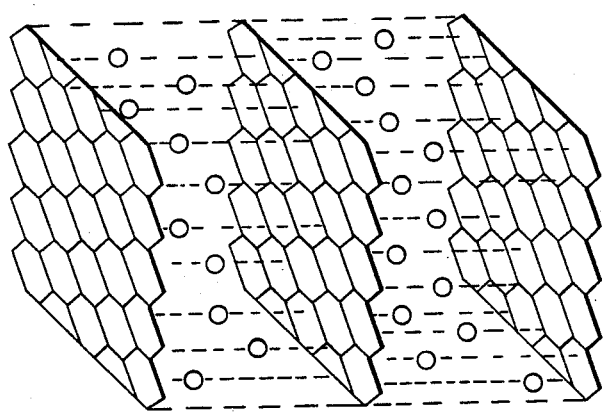
FIG. 1A is a schematic perspective view of a first stage intercalation of graphite.

The small graphite flakes actually used in the experiments described herein measured about 0.2 microns thick and 2 microns in diameter. Samples of graphite flakes of this size may be obtained from the Joseph Dickson Crucible Company of Jersey City, N.J., and may be either natural graphite type HPN-2, spun graphite type 200-10 or synthetic graphite type KS-2.

Other small graphite flakes may also be intercalated using the method and apparatus described herein. Generally, graphite flakes used with this invention have an aspect ratio of at least 10 to 1 in diameter versus thickness. Intercalation of graphite material smaller than 10 microns in mean diameter benefits most from the invention although principles of the invention are applicable to larger graphite flakes.

FIG. 2 is a cross section of a rotary reactor such as used in the reaction method described below. The rotary reactor assembly 10 comprises a two chamber 12, 14 rotary reactor vessel which is positioned in a tubular furnace 17. The chambers are fluidly connected to each other through a glass tube, or bridge. The tubular furnace 17 is surrounded with an insulated tube 16.

The chambers 12, 14 are supported by graphite supports 30, 31 in the tubular furnace 17. The tubular furnace 17 is equipped with six (6) electric heating coils 19 which provide six (6) separate heating zones for the electric furnace. The coils are separately controlled so that evenly controlled and distinct temperature zones are established and maintained in each chamber 12, 14. The reaction chambers are preferably constructed of heat resistant glass or when higher temperatures are required, quartz or ceramic materials.

The rotary reactor is connected through a glass tube 18 to a quick release coupling 20. This coupling through shaft 22 connects the reactor chambers to a variable speed electric motor 24 which can regulate the rotation speed of the reactor during synthesis.

In a typical intercalation, such as described in the examples that follow, graphite flakes are initially placed in chamber 12. When the chambers are rotated during synthesis, three glass blades 23 (FIG. 2A) in chamber 12 mix the graphite. The tubular furnace is supported by supports 26, 27, 28 and 29 on a slight incline to prevent accidental transfer of the graphite from chamber 12 into chamber 14.

An electron-acceptor, metal halide compound is placed in chamber 14. Suitable electron-acceptor metal halides include ferric chloride ($FeCl_3$), copper chloride ($CuCl_2$), aluminum chloride ($AlCl_3$), nickel chloride ($NiCl_2$), antimony chloride ($SbCl_3$), antimony pentachloride ($SbCl_5$), palladium chloride ($PdCl_2$), indium chloride ($InCl_3$), moylbdenum chloride ($MoCl_5$), zirconium chloride ($ZrCl_4$), tantalum chloride ($TaCl_5$) and tungsten chloride ($WCl_6$).

After the loading of the reactants, the two chambers are evacuated and outgassed in vacuum for about two hours. The chamber 12 is held at about 450°–500° C. during the evacuation to remove volatile species from the graphite. The reactor is then brought to a vacuum of about $10^{-6}$ torr.

The next step is to charge the reactor with an intercalation-promoting gas. When intercalating a metal chloride, halogen gases are preferred, examples of which are chlorine, fluorine, or mixtures thereof. Such gas must be provided to the reaction chamber in sufficient quantity to promote intercalation. The rotary reactor is then placed in a tubular furnace 17.

The chambers are held at elevated but slightly different temperatures during synthesis. A temperature of 200°–700° C. is established in chamber 14, to establish a partial pressure of metal halide sufficient for intercalation. Chamber 12, which holds the graphite, is held at a slightly higher temperature than chamber 14. For example, if the temperature in chamber 14 is 300° C., chamber 12 might be maintained at about 320° C. This prevents condensation of the metal halide on the surface of the graphite which would prevent or interfere with homogenous intercalation.

Use of multiple individually controlled heating coils 19 is an important element of the invention. Conventional two zone vapor transport reactors generally utilize only two heating zones, and this results in uneven temperature control which causes condensation of the intercalant.

During the synthesis, the reactor is connected to the variable speed motor 24 which is activated to rotate the reaction chambers. Thus, the entire reactor vessel is slowly rotated by the externally positioned motor. The reactor blades 23 elevate the graphite to the top of the chamber 12 from which it falls to the bottom of chamber, turning and homogenously mixing in the process. The number of blades is unimportant as long as the graphite is thoroughly mixed.

Each reaction chamber (12,14) is kept at a uniform temperature by three of the six coils 19 until the completion of the synthesis at which time, after appropriate cooling, motor 24 is deactivated. After synthesis is complete, chamber 14 is cooled first to prevent the metal halide from condensing on the reaction product in chamber 12. Precise control of temperature is an important element for securing a good product by this synthesis.

Reaction times for the synthesis can be as long as 5–7 days. The product characteristics may differ even for the same intercalant, depending on the temperature differential between the chambers and the reaction time among other parameters.

Characterization of the intercalated compounds can be carried out by x-ray diffraction, thermal gravimetric analysis, weight change measurements and elemental analysis. X-ray diffraction, in particular, serves to reliably analyze and distinguish compound structures.

Separation differs between the intercalated graphite layers in first, second and third stage intercalations. Through x-ray diffraction, layer unit measurements may be taken so that the size of the reproduced intercalation unit is established. This measurement is taken in the c-axis direction which is perpendicular to the a-axis (i.e. the graphite layer). Virgin graphite starting material has a unit size (Ic) of about 3.35 angstroms, while a first stage intercalation has a unit size of about 9 angstroms, a second stage compound about 12 angstroms, and a third stage compound about 16 angstroms. Thus, through x-ray diffraction, exact characterization of the product can be made.

The invention will now be further illustrated by the following examples.

The following table presents various reaction conditions employed and the resulting products.

TABLE 1

| Exs. | $T_{graphite}$ | $T_{FeCl_3}$ | Partial Pressure of Chlorine gas | Time Days | Stage Formation (X-ray Diffraction) | Chemical Analysis |
|---|---|---|---|---|---|---|
| A. Graphite type: Experimental Synthetic Gaphite KS-2 | | | | | | |
| 1. | 340° C. | 300° C. | 700 mm-Hg | 5 | 4th stage $Ic = 19.24$ Å | $C_{28.6}FeCl_3$ |
| 2. | 330 | 310 | 700 | 6 | 1st stage $Ic = 9.26$ Å | $C_{12.05}FeCl_3$ |
| 3. | 335 | 308 | 730 | 7 | 2nd stage $Ic = 12.73$ Å | $C_{13.3}FeCl_3$ |
| 4. | 330 | 310 | 0 | 5 | Major phase is unreacted graphite with a minor phase of a mixture of 2nd and 3rd stages of graphite —$FeCl_3$ compound | |
| 5. | 315 | 310 | 0 | 5 | Major phase is unreacted graphite with condensed $FeCl_3$ intercalate. | |
| B. Graphite Type: Air Spun Graphite 200-10 | | | | | | |
| 6. | 340° C. | 310° C. | 730 mm-Hg | 7 | 3rd stage $Ic = 16.10$ Å | $C_{13.3}FeCl_3$ |
| 7. | 330° | 310° | 700 mm-Hg | 5 | 2nd stage $Ic = 12.8$ Å | — |
| 8. | 330° | 310° | 0 | 11½ | Major phase is unreacted graphite with a weak pattern of 1st stage graphite $FeCl_3$ intercalant. | |
| C. Graphite Type: Natural Graphite Flakes HPN-2 | | | | | | |
| 9. | 328° C. | 310° C. | 150 mm-Hg | 5 | 2nd stage graphite $FeCl_3$ | |
| 10. | 330° | 310° | 0 | 13 | Major phase is unreacted graphite with possible Stage II or III intercalation compounds present. | |

EXAMPLES 1-10

Three types of graphite powders, manufactured by the Joseph Dixon Crucible Company, Graphite and Lubricants Division of Jersey City, N.J. were used. Each of these graphite powders has a diameter of about 2.0 microns and a thickness of 0.2 microns. All of the intercalation reactions were conducted in a multi-zone vapor-transport apparatus of the type illustrated in FIG. 2.

Graphite (0.5 grams) and $FeCl_3$ (excess amount) were placed in reactor chambers 12 and 14 respectively. Prior to intercalation, graphite powders were outgassed at 450° C. in vacuum for 2 hours and anhydrous $FeCl_3$ was purified in situ by sublimation. The reactor was cooled and then evacuated to $10^{-6}$ torr prior to each reaction. A measured amount of chlorine gas was then added to the reactor. The pressure of the added chlorine gas was measured with a capacitance manometer.

During synthesis, each zone of the tubular furnace was adjusted to maintain the graphite zone and the $FeCl_3$ zone at the temperatures shown in the tables which follow. After 5 days or more, the reactor tube was cooled in such a way that the $FeCl_3$ end cooled first, thereby minimizing the condensation of $FeCl_3$ on the flakes.

Based on the above experiments, all three types of small size flakes were intercalated to staged compounds with anhydrous $FeCl_3$.

The results should be similar for other metal halides, however, reaction parameters such as temperature, promotor gas pressure and time will vary. Although the mechanism of intercalation of small graphite flakes is not yet fully understood, the rate of reaction is clearly a function of:

(1) added chlorine pressure; the minimum amount of chlorine needed to accelerate the reaction rate is about 150 torr for ferric chloride;

(2) the temperature difference between the two reactants graphite and $FeCl_3$; the smaller the temperature difference, the lower is the stage of the graphite intercalates;

(3) the crystallinity of graphite powders and perfectness of the edge of particles; the intercalation behavior of these three types graphite powders are essentially the same.

INDUSTRIAL APPLICATIONS

An intercalated graphite complex including ferric chloride is particularly useful in electromagnetic shielding applications. Due to advances in low power semiconductor technology, very small currents are utilized in modern electronic devices. Electromagnetic interference such as lightning or radio waves has been shown to disrupt such electronic circuitry. It has therefore become important to package sensitive electronics in grounded shielded containers that prevent random electromagnetic pulses from reaching the electronics.

Common shielding is usually made of metals such as aluminum, steel or copper. These metals are both expensive and heavy. Intercalated graphite with ferric chloride is inexpensive and nearly as good a conductor of electricity as the above-mentioned metals. Further, graphite is extremely light and easy to incorporate into molded or machined forms which can be used to shield electronics. Encapsulation of the intercalated graphite enhances its stability. Encapsulation is probably necessary for use of the graphite in permanent applications such as shielding of electronic components. It is therefore evident that especially in avionic applications where weight is an important factor, this compound can be an important money saver. Substitution of graphite for metal saves weight on aircraft and therefore saves expensive fuel.

This material is ideal for use as an obscurant because it is an effective absorber of electromagnetic radiation from the ultraviolet to microwave region including visible and infrared light. A quantity of this material sprayed or dispersed from an aircraft as chaff can be used to obscure the vehicle from radar or laser tracking.

A useful property of these intercalated compounds is their characteristic exfoliation or sudden expansion in contact with heat. The light weight of exfoliated material is a big advantage in aiding long term suspension of the particles in air. Intercalated graphite particles of less than 10 microns in size will remain suspended in air for a very long time being only two or three times the density of air.

The material also has a big weight advantage on aircraft compared to conventional obscurants such as metal particles and films. Further, graphite is relatively non-toxic and therefore can be used as a battlefield obscurant without harming soldiers or civilians. The intercalated compounds are completely stable when stored in inert gas and is sufficiently stable in air for use as an obscurant since obscurant properties fall off quite slowly as the intercalant diffuses out of the graphite. It should also be noted that this material could also be incorporated into aircraft surfaces to act as an infrared (IR) signature suppressant.

EQUIVALENTS

There are many substitutions which can be made in both the method and apparatus disclosed above without departing from the spirit and scope of the invention as described in the appended claims. For example, it is most important that the graphite be agitated during synthesis of the intercalation and the graphite starting material may be either powder, flakes or fibers. The rotary reactor described and shown above could easily be fabricated so that complete rotation is not required. The chambers themselves may be larger or smaller depending upon the amount of the product required.

It should also be noted that halide and halogen combinations may be varied from that described in the illustrative examples. Finally, those skilled in the art will recognize, or be able to ascertain using no more than routine experimentation, that there are many equivalents to the specific examples in the invention described herein.

We claim:

1. A method of intercalating small graphite flakes with an electron-acceptor metal halide, comprising:
   placing said graphite flakes in a first zone of a two zone vapor transport reactor;
   placing said metal halide in a second zone of said reactor;
   charging said reactor with an intercalation-promoting halogen gas;
   supplying heat to the second zone of said reacotr to provide a temperature therein sufficient to vaporize said metal halide and produce a partial pressure of the metal halide sufficent to promote intercalation;
   supplying sufficient heat to the first zone of said reactor to provide a temeprature therein slightly elevated with regard to the temperature in said second zone and sufficient to prevent condensation of the metal halide on the graphite;
   slowly rotating said reactor about its horizontal axis while supplying heat to the second zone of said reactor and to the first zone of said reactor; and
   maintaining said reaction conditions until the graphite flakes have been intercalated with said metal halide.

2. The method of claim 1 wherein the aspect ratio of the graphite flakes is at least about 10 to 1.

3. The method of claim 2 wherein said graphite flakes have a mean flake diameter of less than about 10 microns and a mean thickness of less than about 1 micron.

4. The method of claim 3 wherein said intercalation-promoting gas is chlorine.

5. The method of claim 4 wherein said metal halide is selected from the group consisting of: $FeCl_3$, $CuCl_2$, $SbCl_5$, $SbCl_3$, $PdCl_2$, $NiCl_2$, $MoCl_5$, $ZrCl_4$, $HgCl_2$, $AlCl_3$, $InCl_3$, $TaCl_5$, and $WCl_6$.

6. The method of claim 4 wherein said metal halide comprises ferric chloride.

7. The method of claim 6 wherein the graphite flakes comprise spun flakes.

8. The method of claim 6 wherein the graphite flakes comprise natural graphite flakes.

9. The method of claim 6 wherein the graphite flakes comprise synthetic graphite flakes.

10. A method of claim 6 in which the reactor is a horizontally positioned cylindrical rotary reactor.

11. A method of intercalating small graphite flakes with ferric chloride, comprising:
    placing the graphite flakes in a first zone of a two zone vapor transport reactor;
    placing the ferric chloride in a second zone of a two zone vapor transport reactor;
    charging the reactor with chlorine gas;
    supplying heat to the second zone of the reactor to provide a temperature therein sufficient to vaporize the ferric chloride and produce a partial pressure of the ferric chloride sufficient to promote intercalation;
    supplying sufficient heat to the first zone of the reactor to provide a temperature therein slightly elevated with regard to the temperature in the second zone and sufficient to prevent condensation of the ferric chloride on the graphite;
    slowly rotating the reactor about its horizontal axis while supplying heat to the second zone of the reactor and to the first zone of the reactor; and
    maintaining the reaction conditions until the graphite flakes have been intercalated with the ferric chloride.

* * * * *